No. 637,177. Patented Nov. 14, 1899.
L. S. STARRETT.
CUTTING NIPPERS.
(Application filed May 1, 1899.)
(No Model.)
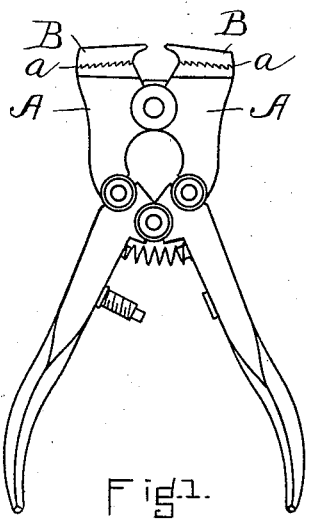
Fig. 1.
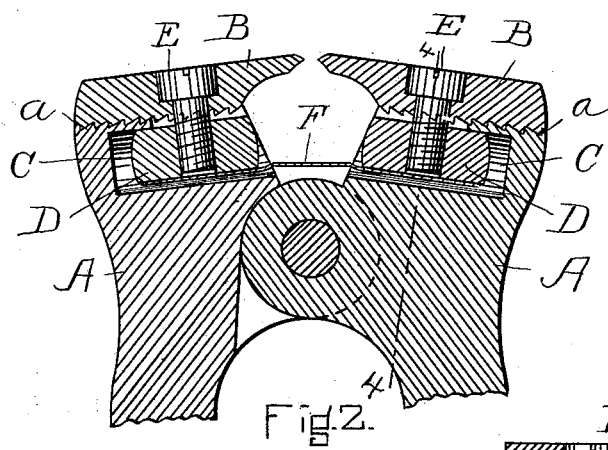
Fig. 2.
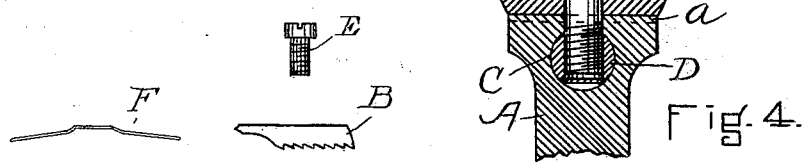
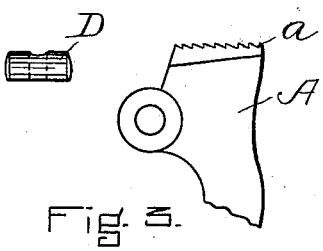
Fig. 3.
Fig. 4.
WITNESSES.
Matthew M. Blunt
Chas. H. Gannett
INVENTOR.
Laroy S. Starrett
by N. N. Spencer,
ATT'Y.
THE NORRIS PETERS CO., PHOTO-LITHO., WASHINGTON, D. C.

UNITED STATES PATENT OFFICE.

LAROY S. STARRETT, OF ATHOL, MASSACHUSETTS.

CUTTING-NIPPERS.

SPECIFICATION forming part of Letters Patent No. 637,177, dated November 14, 1899.

Application filed May 1, 1899. Serial No. 715,098. (No model.)

*To all whom it may concern:*

Be it known that I, LAROY S. STARRETT, of Athol, in the county of Worcester and State of Massachusetts, have invented certain new and useful Improvements in Cutting-Nippers, of which the following is a specification.

This invention is in the nature of an improvement upon the cutting-pliers set forth in United States Letters Patent No. 568,242, granted September 22, 1896, to Charles P. Fay, assignor to myself. In said Fay patent the tool was provided with removable and adjustable cutting-jaws connected to the pivoted members of its head by an interposed dovetailed piece fitting in a groove in each of said parts, the head and jaws being transversely notched or corrugated and a taper-bodied screw extending through said head and interposed piece, serving to hold such notched parts in position when adjusted.

My improved tool retains the notched head and jaws, but omits the grooves in said parts and the interposed piece therein, with its tapered transverse screw.

My present improvement is a new means for making each jaw adjustable and for securing it when adjusted, the device being remarkably simple and thoroughly efficient. I make an elongated hole, preferably a drilled perforation, in the inner face of each member of the head, just beneath its notched surface and centrally in the plane of its movement, and insert therein a sliding pin of corresponding shape having about midway a transverse threaded perforation to receive a short screw, which, passing through a perforation in the cutting-jaw, draws it down to the head. The notched surface of the head over said pin is cut away sufficiently to admit the screw and permit its sidewise movement when the pin moves longitudinally in adjusting the position of the jaw. I prefer to flatten the under side of these pins and to introduce under each the projecting tongue of a thin metallic spring, which forms a yielding stop for the wire being cut. This construction keeps the pins right side up to receive the screw and prevents them from dropping out when the screw is removed.

In the drawings, Figure 1 is a side view of a pair of cutting-nippers of the Fay pattern provided with my improvement. Fig. 2 is an enlarged section through the head portion of the tool, showing my improved construction. Fig. 3 represents the parts detached. Fig. 4 is a cross-section on line 4 4, Fig. 2.

A represents the two pivoted members of the head of the tool, transversely notched on the upper end to receive the cutting-jaws B, similarly notched on their under surface, as at *a*. Cylindrical perforations C are formed in the inner faces of the parts A near the top and centrally to admit the nearly cylindrical pins D, movable endwise therein. Each pin D has about centrally a threaded transverse perforation which receives the tip of the screw E, passing through a countersunk hole in the cutting-jaw and through a narrow opening above and parallel with said pin. These openings through the notched surfaces of the head are to permit adjustment of the jaws B by slackening without removing the screws E, the screw-body moving sidewise in such opening, while the pin moves endwise in its perforation. When the screws are tightened, the jaws are held firmly in their operative position.

F represents a thin metallic spring having at each end a slender tongue extending into the perforation C beneath the pin D, which may be flattened for the purpose. These tongues hold the pins in position to receive the screws E. The enlarged central part of this spring constitutes a yielding stop for the end of the wire being cut to bear against.

I claim as my invention—

1. In cutting-nippers, a jaw-holding device comprising a sliding pin in a suitable perforation in each member of the head, and a screw passing through each jaw and the end of the head it bears on and engaging terminally in a threaded lateral socket in such pin, substantially as set forth.

2. In cutting-nippers, the head having two pivoted members suitably actuated, notched transversely on the upper end and having each a central perforation extending from its inner face in the plane of its movements, in combination with a pin adjustable longitudinally in each perforation, a cutting-jaw applied to the notched end of each member, and a screw through said jaw and through an elongated opening in said member and threaded into said pin, substantially as set forth.

In testimony whereof I have affixed my signature in presence of two witnesses.

LAROY S. STARRETT.

Witnesses:
FRANK E. WING,
WILLARD G. NIMS.